United States Patent [19]

Rackman

[11] 4,002,843
[45] Jan. 11, 1977

[54] TAMPER-PROOF TWO-WAY CABLE SYSTEM

[76] Inventor: Michael I. Rackman, 1710 Glenwood Road, Brooklyn, N.Y. 11230

[22] Filed: Aug. 4, 1975
[21] Appl. No.: 601,544

Related U.S. Application Data

[63] Continuation of Ser. No. 424,925, Dec. 17, 1973, abandoned, which is a continuation of Ser. No. 290,857, Sept. 21, 1972, abandoned.

[52] U.S. Cl. .................. 179/15 AL; 178/DIG. 13; 179/15 BD; 325/308
[51] Int. Cl.² .......................................... H04J 3/08
[58] Field of Search ................. 179/15 AL, 15 BD; 178/DIG. 1, 13, 23, 5.1, 58 R, 58 A; 325/308; 340/151 R, 152 R

[56] References Cited

UNITED STATES PATENTS

| | | | |
|---|---|---|---|
| 3,647,976 | 3/1972 | Moses | 179/15 AL |
| 3,769,579 | 10/1973 | Harney | 178/DIG. 13 |
| 3,796,829 | 3/1974 | Gray | 178/DIG. 13 |

Primary Examiner—David L. Stewart
Attorney, Agent, or Firm—Gottlieb, Rackman, Reisman

[57] ABSTRACT

There is disclosed a two-way cable system in which the deliberate introduction of continuous upstream message interference at any subscriber terminal does not destroy the efficacy of the system. Each subscriber terminal is coupled through an interface unit to the cable, and the interface unit permits upstream transmission of a message from the respective terminal only following recognition by the interface unit of the downstream transmission of the address of the respective terminal. Because the interface units are located off the premises of the subscribers, a deliberately introduced interference signal on a subscriber line cannot reach the cable except during the respective time slot of the subscriber.

2 Claims, 6 Drawing Figures

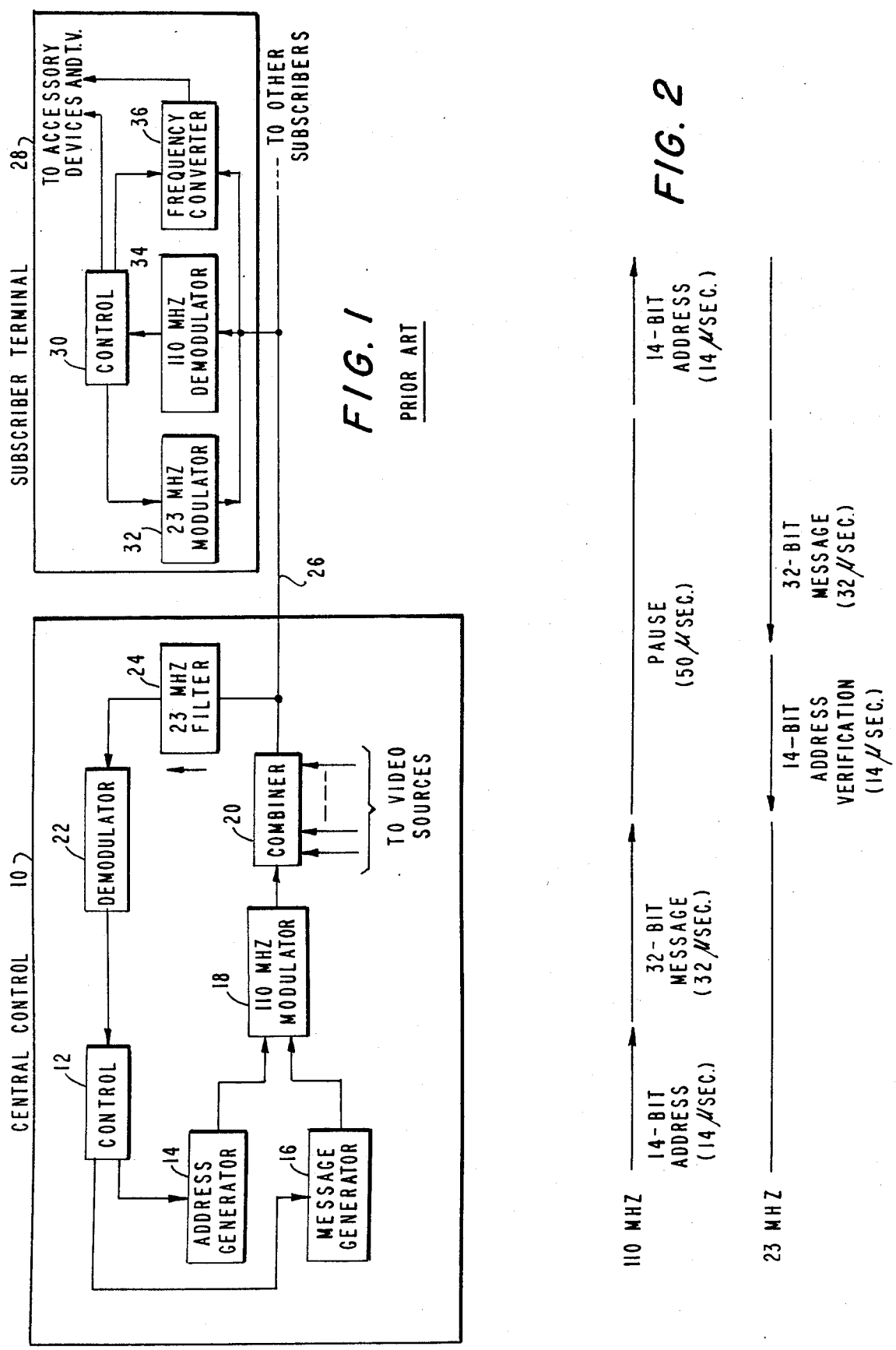

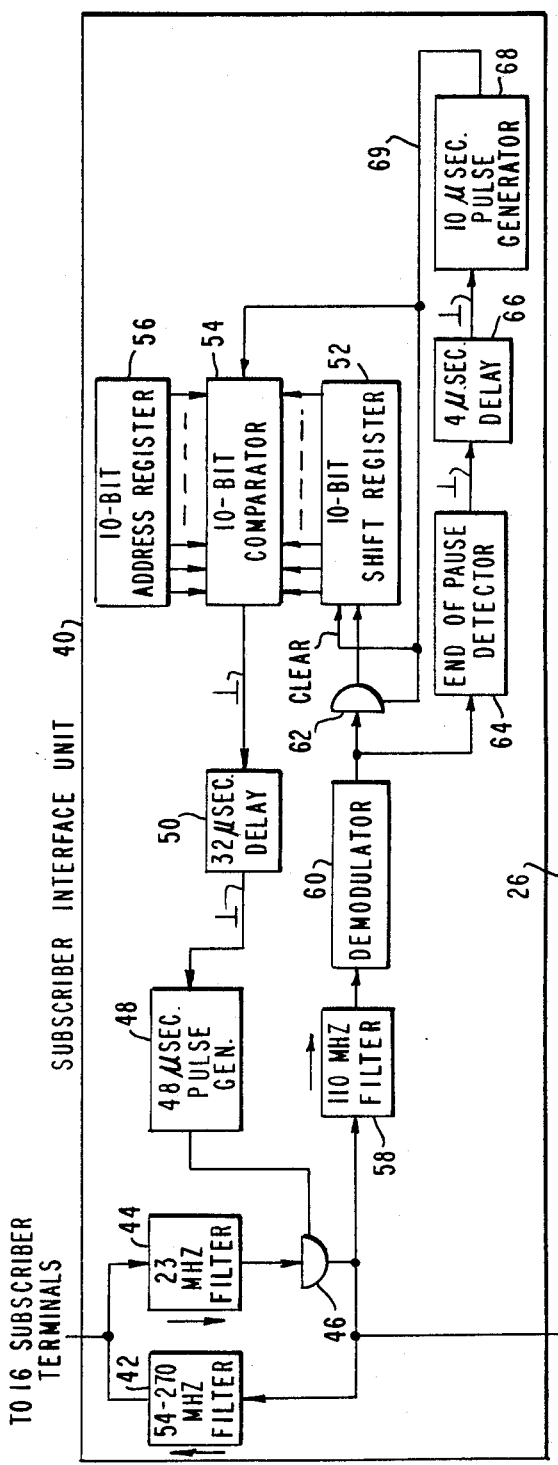
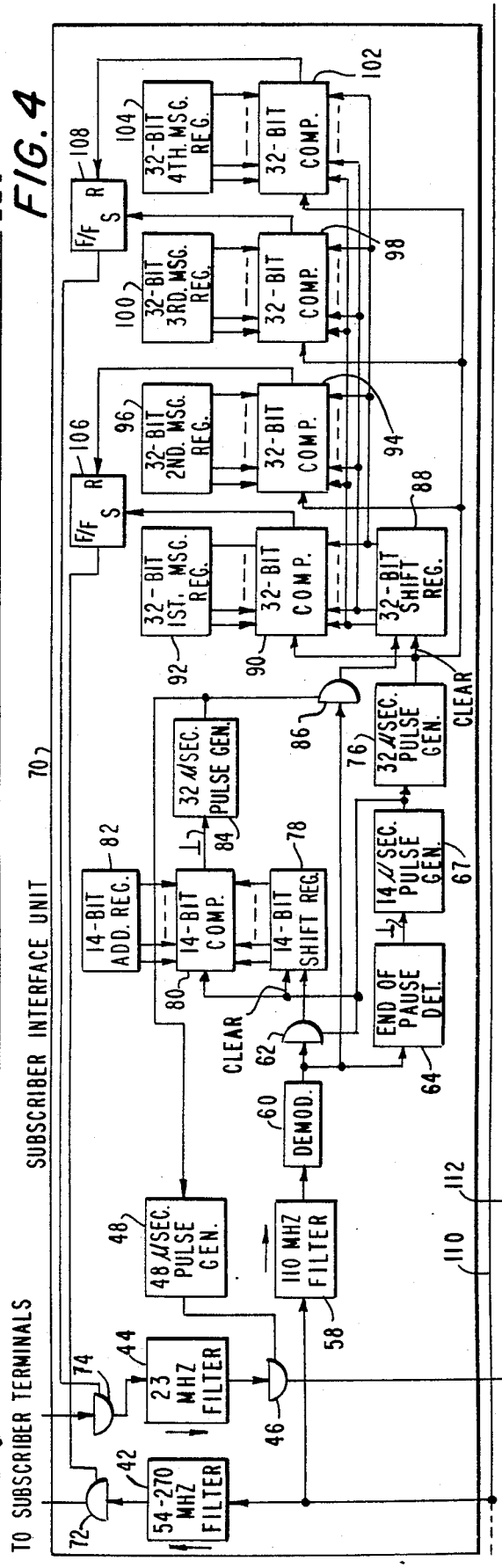
FIG. 3
FIG. 4

TAMPER-PROOF TWO-WAY CABLE SYSTEM

This application is a continuation of application Ser. No. 424,925, filed on Dec. 17, 1973, and now abandoned, which application was a continuation of application Ser. No. 290,857, filed on Sept. 21, 1972, and now abandoned.

This invention relates to two-way cable systems, and more particularly to such systems which have improved tamper-proofness and serviceability.

The concept of cable television has evolved to the point where two-way cable systems are already being built and tested. Cable television, as originally proposed, involved the transmission over coaxial cable of television broadcast signals to a plurality of subscribers. By adding the capability of transmission from the subscribers to a central computer, it is possible to envision many different services which might be provided. In such a two-way system, in addition to the "downstream" transmission of television broadcast signals to the subscribers, coded data signals can be sent as well. These signals, for example, can be transmitted on a time division multiplex basis, with each subscriber having a different address and each message from a local processing center being preceded by the address of the particular subscriber for whom the message is intended. Following the receipt of his address by the subscriber terminal, a reply message may be transmitted "upstream" back to the local processing center. There is one problem, however, which poses a great threat to the successful implementation of two-way cable systems.

This problem is also present in the forerunner cable television systems, but there it has a relatively simple solution. Since all subscribers to a cable television system are connected in parallel to the same cable, it would appear that spurious signals on any subscriber line could interfere with the video signals transmitted to all subscribers. The solution to this problem is to utilize a directional coupler for connecting the cable to each subscriber line. Such a coupler permits the transmission of the video signals from the head end of the system over the cable and from the cable to each subscriber line, without at the same time permitting signals which originate on each subscriber line to be transmitted in the reverse direction back to the cable with sufficient intensity to interfere with the video signals.

But with a two-way system, it is apparent that such a technique is not feasible for the simple reason that signals from the individual subscribers must be allowed to reach the cable; otherwise, there can be no two-way system in the first place. Even if different cables are used for the upstream and downstream directions so that a spurious signal from a subscriber line can interfere only with the upstream messages to the local processing center and cannot interfere with the downstream video and message signals, the two-way message capability of the system can be destroyed if interfering "message" signals reach the upstream cable from any single subscriber line.

In a time division multiplex system, each subscriber terminal is designed to transmit a message to the local processing center only after the respective address of the subscriber has been received from the center. However, in the case of a malfunctioning subscriber terminal, it is possible for messages to be transmitted at the wrong time. More significant is the fact that an ordinary system of this type is not tamper-proof. A disgruntled subscriber, for example, might simply cut his line and connect to it an oscillator whose frequency is the same as that of the upstream transmission. In such a case, no intelligible upstream messages could reach the local processing center from the other subscribers. What is even worse is that it may be exceedingly difficult to discover the offending subscriber.

It is a general object of my invention to provide an improved tamper-proof two-way cable system.

It is another object of my invention to provide a two-way cable system which facilitates the diagnosis of malfunctioning equipments and subscriber lines.

In accordance with the principles of my invention, in one embodiment thereof, each subscriber line is coupled to the cable (or cables, in case two of them are used for transmission in the two different directions) through a subscriber interface unit. This unit is disposed adjacent to the cable which is generally not accessible to the public. The interface unit is designed so that it permits the transmission of a message from a subscriber to the cable only immediately after the subscriber's address has been transmitted from the local processing center to the subscriber terminal. As in prior art systems, the subscriber terminal can still only transmit a message following receipt of the respective subscriber address. But even if a message is somehow (e.g., deliberately) transmitted from the subscriber terminal at the wrong time, it cannot reach the cable. Instead, the message or the deliberately introduced interference can appear on the cable only immediately after the subscriber address has been transmitted from the local processing center. In the event interference is detected on the cable, the local processing center can immediately determine its source simply by noting the subscriber address which was transmitted immediately prior to the appearance of the interference.

The subscriber interface unit includes a transmission path from the cable to the subscriber terminal which is normally closed to permit the transmission of downstream signals to the subscriber. This is necessary, for example, to permit the display on the subscriber's television set of a video broadcast. But the transmission path from the subscriber terminal to the cable is normally open so that even deliberately introduced interference signals cannot reach the cable from the subscriber's premises. It is only immediately after the receipt of the subscriber's address by the interface unit (which address is also forwarded to the subscriber terminal through the normally closed transmission path) that the normally open transmission path is closed just for the time period which is allotted to the transmisson of a message from the subscriber to the local processing center. (The technique is applicable to any type of system in which "addresses" are transmitted, be those addresses a series of pulses, a group of frequencies, etc.)

It should be noted that the subscriber's terminal need not include address recognition circuits because that function is now performed by the interface unit. The interface unit can control when upstream transmission from the respective subscriber takes place. Similarly, other functions now contemplated for the subscriber's terminal can be transferred to the interface unit. The particular function of concern to the present invention is the control of upstream transmission by equipment which is not accessible to the subscriber.

The added requirement of a subscriber interface unit for each individual subscriber necessarily increases the cost of the overall system. However, it is possible to greatly reduce that cost. This can be accomplished by providing only a single interface unit for several different subscribers, with the individual subscriber lines being connected in parallel, through the interface unit, to the cable. If a separate interface unit is provided for each subscriber, then the address which that unit must recognize to close the transmission path from the subscriber to the cable must be the full address of the respective subscriber. But if a single interface unit is used for several subscribers, that interface unit must recognize the addresses of all of the subscribers connected through that unit to the cable. Thus, if the local processing center transmits the address of any one of the grouped subscribers, the interface unit must permit the response from the designated subscriber to be transmitted back to the cable. This is very easy to accomplish, particularly if the addresses of the grouped subscribers have the same bit values in most of the bit positions of an address word, as will be described below.

Of course, in the case of a deliberately introduced interference signal of one subscriber, that signal would reach the cable during the time slots of all of the grouped subscribers. Although several subscribers thus may be inconvenienced, the cost savings may be very great since only one interface unit is required for all of them. Also, since non-intelligible messages will be received by the local processing center during only the time slots allotted to the respective group of subscribers, the cable operator can determine immediately which of many groups of subscribers has a malfunctioning line. The offending line can then be determined by making only several service calls.

Because each subscriber interface unit has the capability of recognizing an address transmitted from the local processing center, these units may be used for purposes other than to limit upstream messages from subscribers to respective time slots. In other words, messages can be sent from the local processing center to an interface unit as well as to its respective subscriber(s). For example, in a typical two-way cable system, following the transmission of a subscriber address by the local processing center, there is transmitted a message for the subscriber. (This is then followed by the return transmission from the subscriber terminal of the subscriber address for verification purposes, followed by a subscriber message.) When the subscriber terminal detects its respective address, it "knows" that the next message is for it. But in a system in which one interface unit is provided for each subscriber line, since the interface unit also detects the same address, the interface unit can be made to perform certain operations in response to the transmission of particular messages. These messages may have codes for which the subscriber terminal takes no action, but for which the interface unit does. For example, the specially coded messages which are acted upon by the interface unit might control the cutting off of subscriber service or its reinstatement.

Still another application of this concept of address and message recognition by the interface units pertains to the sharing of common facilities by two different cable systems. For example, consider the case in which two separate cable systems are provided, each with its own local processing center and each of which is fully loaded in that it services the maximum number of subscribers for which the system is designed. Suppose further that one of the local processing centers ceases to operate properly. By throwing a switch which interconnects the two cables, the still operative local processing center can communicate with all subscribers on both cables. However, since for every subscriber on each cable there is another subscriber on the other cable who has the same address, it is apparent that intelligible two-way communication is not possible.

But suppose further that each subscriber interface unit, after recognizing its respective address, is further capable of recognizing a message code which indicates that the two cables are to be interconnected. In response to this message recognition, each interface unit connected to one cable thereafter controls the two-way transmission of messages through it in only even alternate time slots allocated to the two subscribers who now have the same effective address. Similarly, each interface unit coupled to the other cable modifies its operation to control two-way message communication through it in only odd alternate time slots. Although the rate of polling of any individual line is halved, all lines can be serviced. Following resumption of the operation of the malfunctioning local processing center, messages can be sent to all of the interface units to modify their operations so as to function in the normal mode.

The various interface units described above are capable of recognizing subscriber addresses. It is also possible, of course, to assign addresses to the interface units which are not the same as subscriber addresses. For example, this would obviate the need to design subscriber terminals which would not respond to messages which have meaning only to the interface units. This technique of assigning addresses to equipments located along the cable (as opposed to the subscriber terminals on the premises of the various subscribers) can also be extended to equipments which are not really assigned to individual subscribers or groups of subscribers.

For example, as disclosed in detail below, successive sections of cable can be coupled to each other by "cable couplers". Each of these couplers may include two-way amplifiers. The cable couplers can also be addressed by the local processing center, each cable coupler having a unique address. When a cable coupler detects its address, for example, it might turn off its amplifiers. These amplifiers might turn on again the next time that the respective address is received. Alternatively, each cable coupler might be capable of recognizing two coded messages, following recognition of its address, one of which messages might turn off the amplifiers and the other of which might turn them on again. By selectively turning off the amplifiers in the cable couplers, it is possible to "break" the line at selected points. This may be very helpful in the diagnosis of malfunctions along the cable.

For example, suppose that in a two-cable system it is determined that there is a short on the upstream cable, that is, no intelligible messages are being received by the local processing center. The local processing center might then transmit over the still operative downstream cable the address of the nearest cable coupler, followed by a message which would turn off the amplifiers in that coupler. If intelligible messages are now received from subscribers connected to the cables along the sections of cable between the local processing center and the first cable coupler, then it is known that the short is further down the line. The local processing center might then transmit the address of the first cable coupler followed by a message which would return it to normal operation, and it might then transmit the address of the second cable coupler down the line, followed by a message which would control the turn off of its amplifiers. If intelligible messages are now received once again, it is known that the short is not along the second section of cable. This process can be continued until a cable coupler has its amplifiers turned off, following which intelligible messages are no longer received. This means that the short is along the length of upstream cable which precedes that cable coupler in the direction toward the local processing center.

Further objects, features and advantages of my invention will become apparent upon consideration of the following detailed description in conjunction with the drawing, in which:

FIG. 1 depicts schematically the major blocks of equipment which are to be found in prior art type two-way cable systems;

FIG. 2 depicts an illustrative message sequence for the system of FIG. 1;

FIG. 3 depicts a first illustrative embodiment of my invention — a subscriber interface unit for servicing sixteen subscriber terminals;

FIG. 4 depicts a second illustrative embodiment of my invention — a subscriber interface unit for servicing only one subscriber terminal but which is capable of responding to commands from the local processing center;

Figure 5:
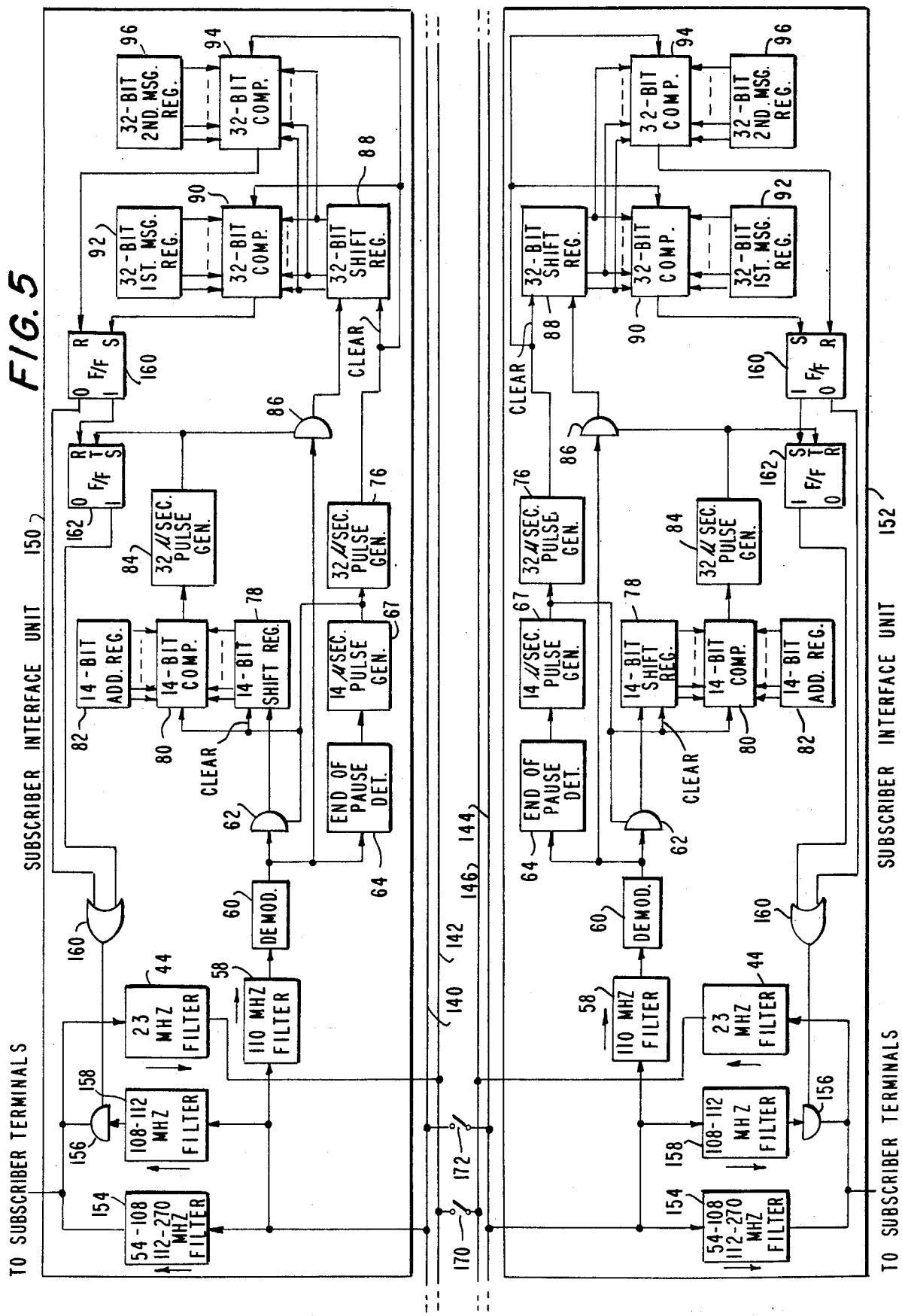
Figure 6:
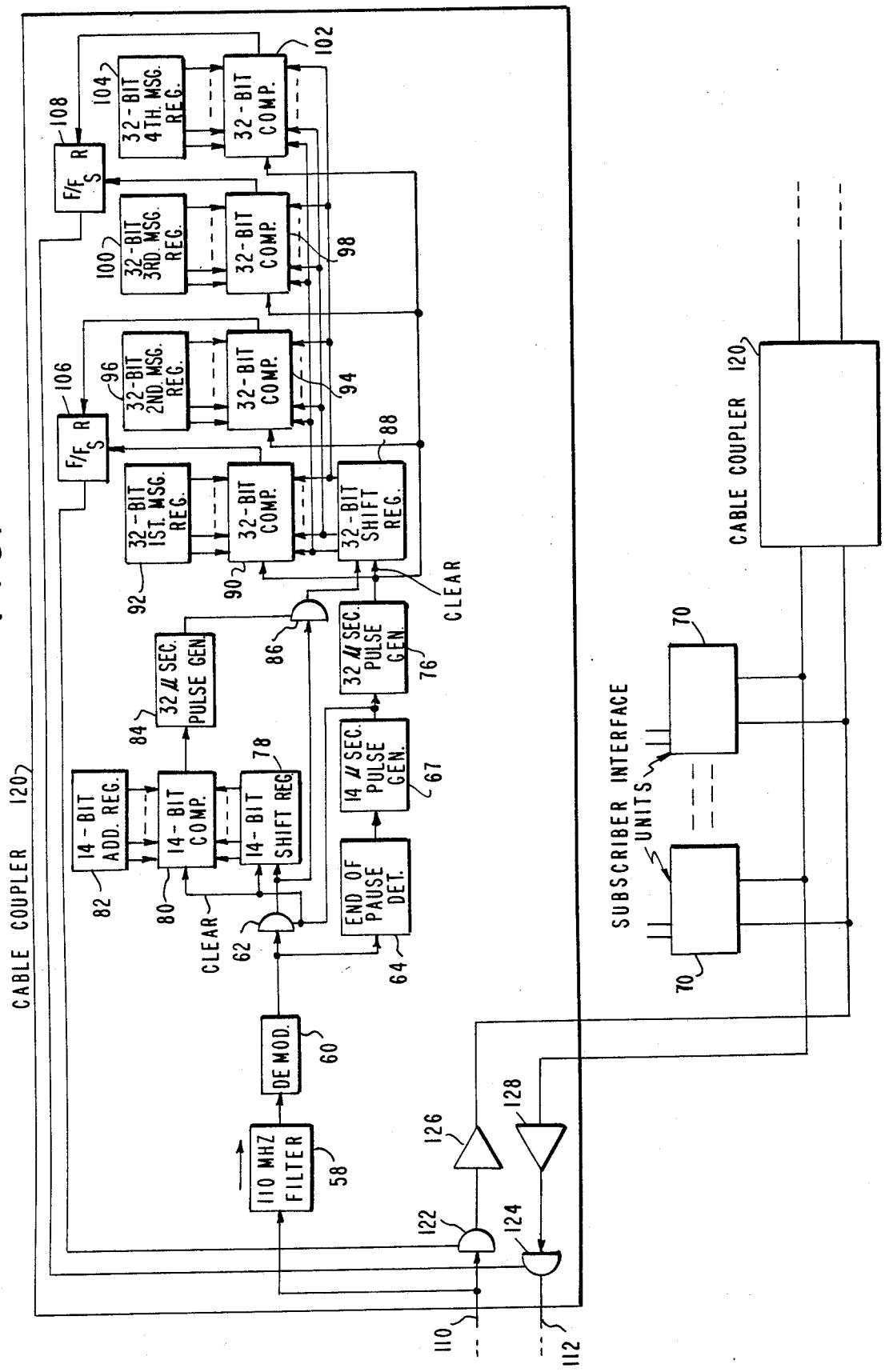

FIG. 5 depicts a third illustrative embodiment of my invention — a pair of subscriber interface units connected to different cables which respond to transmitted commands from a local processing center to modify their operations in the event the cables of two different systems are connected together for operation with only one of two local processing centers; and FIG. 6 depicts a fourth illustrative embodiment of my invention — a cable coupler for coupling two sections of cable, and which is assigned a unique address and which recognizes commands to turn its amplifiers on and off.

The prior art system of FIG. 1 includes a central control 10, a cable 26, and a plurality of subscriber terminals 28 (only one of which is shown). Two-way communication takes place over the same cable 26 by allocating different frequencies for the upstream and downstream directions. In the downstream direction, that is, from the central control to the subscriber terminals, frequencies in the band 54-270 MHz are transmitted. These signals are for the most part video signals. However, signals in the band 108-112 MHz represent suscriber terminal addresses and messages for individual subscribers. The downstream form of communication in this 4-MHz band is digital pulse code modulation at a 1 Megabit per second rate. Digital data (addresses and messages) are used to frequency-shift key a 110-MHz carrier as is known in the art.

The upstream signal occupies a 4-MHz bandwidth extending from 21 to 25 MHz. The same form of PCM communication is used at the same data rate of 1 Megabit per second. In this case, the digital data from the subscriber terminals are used to phase-shift key a 23-MHz carrier. (Although it is contemplated that two-way cable systems will also provide for the transmission of video information from subscribers in the upstream direction, it is assumed in the illustrative embodiments of the invention that such signals are not transmitted. That the principles of the invention are applicable to such extended systems will be apparent to those skilled in the art.)

The central control 10 includes a combiner 20 which serves to combine both digital data from 110-MHz modulator 18 and various video broadcast signals from separate sources. All of the signals are combined and then transmitted down the cable in the 54-270 MHz band. With respect to the downstream digital data, control 12 determines the address of the next subscriber to whom a message is to be sent and loads it in address generator 14. Similarly, the digital message for that subscriber is loaded in message generator 16. The address in generator 14 is then used to modulate a 110-MHz carrier in modulator 18, following which the same carrier is modulated by the digital data in message generator 16. The data transmission sequence is determined by control 12. As will be described with reference to FIG. 2, a pause is then provided so that the central control can detect a subscriber response; in the absence of any address or message to be transmitted in the downstream direction, modulator 18 ceases to generate the 110-MHz carrier and it does not appear along the cable.

The responses from the subscriber terminals, in the forms of modulated 23-MHz carrier signals, which appear on the cable are transmitted through 23-MHz filter 24 in the direction of the arrow. This filter transmits only signal components in the band 21-25 MHz. The signals are demodulated by demodulator 22 so that the data bits in a subscriber response can be extended to control 12. Typically, control 12 is a computer with the appropriate interface units.

Each subscriber terminal 28 includes a 110-MHz demodulator for extracting the downstream digital data from the central control and for extending the data bits to control 30. Following each pause in the downstream transmission, the address of a subscriber terminal is transmitted. If control 30 recognizes that address as its own, it then takes the appropriate action called for by the message which immediately follows the address.

The appropriate action in all cases includes the transmission of the subscriber address (for verification purposes by the central control — although this is not necessary in a system, but rather only preferable) followed by a message. The message may be a status response or a request for a restricted channel or for some other service as is known in the art. The address and message bits are modulated by 23-MHz modulator 32 and applied to the cable immediately following receipt of the message from the central control.

Cable 26 is coupled to frequency converter 36 in the subscriber terminal 28. The frequency converter functions to extend a subscriber-selected video broadcast (determined by control 30) to the television set of the subscriber. Control 30 also generates commands which are extended to accessory devices, e.g., a printer, located on the premises of the subscriber.

The details of the cable system itself are not important for an understanding of the present invention. What is important, however, is to understand an illustrative transmission sequence so that the various embodiments of the present invention — which are based upon this sequence — can be understood. As shown in FIG. 2, the downstream 110-MHz transmission for each subscriber begins with the transmission of a 14-bit address. Each subscriber is identified by one of the $2^{14}$ or 16,384 possible addresses. Although this is the maximum number of subscribers which can be serviced by the system, since some of these addresses may be required to identify cable couplers, as will be described below, typically no more than 15,000 subscribers will be serviced by the same cable 26 of FIG. 1. The transmission of a 14-bit address requires 14 microseconds since data bits are transmitted at a 1-Megabit rate.

Immediately following the transmission of a 14-bit address, a message for the addressed subscriber is transmitted. This message consists of 32 bits and therefore requires 32 microseconds for transmission. Following the transmission of the message, the central control ceases to transmit the 110-MHz carrier. The pause is for 50 microseconds.

Immediately after a 32-bit message is received by that subscriber terminal which recognized the preceding 14-bit address, the suscriber terminal causes its own 14-bit address to be transmitted to the cable on a 23-MHz carrier. The retransmission in the upstream direction of the subscriber address is for verification purposes so that the central control can determine that it has gained access to the proper subscriber terminal. Immediately after the 14-bit address is transmitted, a 32-bit message is transmitted by the subscriber terminal in the same way. The total transmission time required by terminal subscriber terminal is 46 microseconds. In order to allow the subscriber terminal to detect the 32-bit message from the central control and to compose the proper response, the pause in the downstream direction is made to be 50 microseconds. Following the pause, the 14-bit address of another subscriber is transmitted. The total time required for the two-way transmission between the central control and any suscriber terminal is thus 96 microseconds. It is thus apparent that the central control transmits a message to and receives a message from every subscriber terminal at a rate of approximately once every 1.5 seconds in the case of a 15,000 system.

FIG. 3 depicts a subscriber interface unit 40 for connecting 16 suscriber terminals to cable 26. The interface unit is not on the premises of any subscriber and instead is located near the cable at a point to which the public has no access. The unit includes a 54–270 MHz filter 42 which permits the continuous transmission of the downstream signal from cable 26 to the 16 subscriber lines. The unit also includes a 23-MHz filter 44 which allows the transmission through it of the subscriber response signals. However, the output of the filter is not coupled directly to cable 26. Instead the 23-MHz signal from any subscriber terminal must pass through gate 46 prior to reaching the cable. The gate is normally open so that ordinarily a subscriber cannot control the transmission of a message to the cable — even if he attempts to do so improperly.

The 23-MHz filter shown in FIG. 3 has a bandwidth of 21–25 MHz in order that the modulated carrier be transmitted through it with little distortion. The transmission is only one way — in the direction of the associated arrow. Similarly, 110-MHz filter 58 has a bandpass of 108–112 MHz so that downstream data signals can be transmitted through it, in the direction of the associated arrow, with no distortion.

Address and message signals transmitted in the downstream direction pass through filter 58 and are demodulated by demodulator 60. A series of bit signals are thus applied to the input of gate 62 and to the input of end-of-pause detector 64. The operation of the unit can be understood most easily by assuming that only a single subscriber terminal is connected to the interface unit, that shift register 52 has 14 stages, that address register 56 contains a 14-bit address, and that comparator 54 serves to compare the 14-bit address stored in register 56 with the 14 bits contained in shift register 52. Also, it will be assumed that gate 62 is normally closed so that the output bits from demodulator 60 are inserted into shift register 52.

As the address bits are shifted down the register, eventually the register contains the 14 bits of the address transmitted by the central control. Address register 56 contains the address of the single subscriber connected to the interface unit. Just after the 14th bit has been stored in shift register 52, the level of conductor 69 changes (as will be described below) to trigger the operation of comparator 54. At this time the comparator determines whether the transmitted address matches that of the respective subscriber and, if it does, a short pulse is applied to the input of delay unit 50. After 32 microseconds have elapsed, the pulse is applied to the input of pulse generator 48. The pulse generator is thus triggered and generates a 48-microsecond pulse. This pulse is applied to the control terminal of gate 46 and thus the gate closes for 48 microseconds to allow the transmission of a message from the subscriber to the cable. The 32-microsecond delay is provided so that the gate is not turned on until after the 32-bit message has been received by the subscriber terminal; no transmission from the subscriber terminal should take place until after the message to the subscriber terminal has been received. The pulse generator closes gate 46 for 48 microseconds; although only 46 microseconds are required for the transmission of a 14-bit address verification and a 32-bit message from the subscriber terminal, a 2-microsecond margin of safety is provided.

It is thus apparent that even if the subscriber terminal is deliberately altered so that 23-MHz signals are transmitted continuously, these signals cannot reach cable 26 except during the time slot immediately following the transmission of the address of the subscriber. Not only is the subscriber thus prevented from interfering with the other subscribers in the system, but because the meaningless data are received by the central control only during one time slot the central control can determine their source.

In order to allow several subscribers to share the same interface unit, shift register 52 is provided with only ten stages, and similar remarks apply to comparator 54 and address register 56. It is assumed that the 16 subscribers which share the same interface unit have the same ten most significant bits in their addresses; the 16 subscribers are separately identifiable by the four least significant bits in the 16 addresses. These four bits are the first which are transmitted in any address and since their exact values make no difference insofar as address recognition by the interface unit of FIG. 3 is concerned, they are not stored in the shift register.

Address transmission always begins at the end of a 50-microsecond pause. End-of-pause detector 64 is simply a pulse detector; it detects the first 0 or 1 bit at the output of demodulator 60 at the start of the transmission of an address. Following the detection of a bit at the end of a 50-microsecond pause, unit 64 applies a short pulse to the input of delay element 66. Four microseconds thereafter this pulse is applied to the trigger input of pulse generator 68. When triggered, the pulse generator generates a 10-microsecond pulse which is applied to the enable input of gate 62. In the absence of this pulse the gate does not transmit the bits from the output of demodulator 60 to the input of shift register 52. Consequently, since pulse generator 68 is not triggered until four microseconds have elapsed following the start of the transmission of an address, the four least significant bits in each address are not loaded into the shift register. It is only during the succeeding ten microseconds that the ten most significant bits in a transmitted address are passed through gate 62 and loaded in the shift register.

At the termination of the 10-microsecond pulse, the trailing edge of the pulse on conductor 69 triggers comparator 54. If at this time the 10-bit address in register 52 matches the 10-bit address in register 56, a pulse is applied to the input of delay unit 50 as described above.

In order to clear register 52, the output of pulse generator 68 is also coupled to the clear input of the register. The register is cleared at the trailing edge of the 10-microsecond pulse, but is delayed slightly at the input of the shift register to allow the same trailing edge of the pulse to trigger the operation of comparator 54 prior to the clearng of the shift register.

Although the interface unit is shown as having a comparator and an address register, it will be apparent that in lieu of these elements all that is required is a single gate circuit which is triggered when the proper 10-bit sequence is stored in the shift register together with the trailing edge of the pulse generated by pulse generator 68. It should also be noted that delay unit 50 need not be provided if that is desired, that is, the width of the pulse generated by pulse generator 48 may be 80 microseconds. It is not necessary to prevent the enabling of gate 46 prior to the completion of the receipt of the 32-bit message by the addressed subscriber terminal since even if that terminal is allowed to transmit during the same time it cannot interfere with any of the other subscriber terminals.

It is possible to utilize the same interface unit with 32 subscribers, if desired, simply by increasing the delay of unit 66 to 5 microseconds, decreasing the pulse width of generator 68 to 9 microseconds, and operating upon the 9 most significant bits in each transmitted address. Of course, for every interface unit the need for which is not required by doubling the number of subscribers which share it, twice as many subscribers can be without service in the event a spurious signal appears on any of their lines. It should also be noted that it is not necessary for all of the grouped subscribers which share the same interface unit to have common address bits. For example, it is possible to allow the subscribers to have completely different addresses and to store all of the addresses in a "look-up" table in the interface unit. The receipt of any 14-bit address which matches one of those in the table could result in the triggering of pulse generator 48 and the closing of gate 46.

Subscriber interface unit 70 of FIG. 4 illustrates some of the options which are made available when an interface unit is assigned an address and can recognize it. Although the interface unit of FIG. 4 is designed to operate on separate downstream and upstream cables 110 and 112, it will be apparent that the unit works just as well with a single cable. Subscriber interface unit 70 is designed to serve only one subscriber terminal and therefore it requires a 14-bit address. In addition to controlling the operation of gate 46 so that the subscriber can gain access to the cable only in his respective time slot, the interface unit of FIG. 4 serves in the additional capacity of cutting off service to the subscriber, for example, in the event he does not pay his bill.

Just as there are two separate cables 110 and 112 for the upstream and downstream directions, two separate lines are extended to the subscriber terminal. The downstream cable 110 is connected through filter 42 in the interface unit and gate 72 to the incoming subscriber line. The subscriber can receive messages from the local processing center as well as video broadcast signals only if gate 72 is closed, that is, only if he is to receive service. Similarly, the outgoing line of the subscriber is coupled through gate 74, as well as filter 44 and gate 46, to the upstream cable 112. The subscriber is permitted to transit messages to the local processing center only if his line is in service. (In the event a single cable is used for transmission in both directions and only a single cable is extended to the subscriber terminal, then instead of utilizing two gates 72 and 74, a single bi-directional gate could be used.) It is not necessary that both of gates 72 and 74 be disabled or enabled together. Although in most practical applications they would be, separate controls are shown for both gates so that maximum flexibility of the interface unit can be realized. That is to say, the interface unit 70 of FIG. 4 is designed to recognize four different commands and to take four different appropriate actions. It will be apparent that the same techniques to be described below can be utilized to control other kinds of responses by the interface unit. (It is even possible to allow the interface unit to send a message to the local processing center; in such a case, the interface unit would not only serve to couple the subscriber terminal to the cable but would also function, at least in certain aspects, as does a subscriber terminal.)

Downstream 110-MHz signals are transmitted through filter 58 to demodulator 60 as they are in the case of the interface unit 40 of FIG. 3. Gate 62 is not ordinarily enabled. As soon as end-of-pause detector 64 determines the initiation of the transmission of an address, it generates a short pulse which triggers 14-microsecond pulse generator 67. Unlike pulse generator 68 of FIG. 3, since a 14-bit address is required to identify interface unit 70, the pulse width of pulse generator 67 is made equal to 14 microseconds rather than 10 microseconds. At the start of the first bit in the transmitted address, gate 62 turns on so that the full 14-bit address can be applied to the input of shift register 78. Following the transmission of a 14-bit address, pulse generator 67 turns off so that no additional bits are entered into the shift register.

The 14-bit address of the interface unit is stored in register 82 and comparator 80 serves to compare this address with the address stored in the shift register. At the trailing edge of the 14-microsecond pulse generated by pulse generator 67, the trigger input of comparator 80 is energized so that the comparator extends a short pulse to the input of pulse generator 84 in the event a match was detected. The trailing edge of the 14-microsecond pulse also serves to clear shift register 78, just as the trailing edge of the 10-microsecond pulse in the interface unit of FIG. 3 serves to clear shift register 52.

The 32-microsecond pulse generated at the output of pulse generator 84 serves two functions. First, the trailing edge of the pulse triggers pulse generator 48. Thus this pulse generator is triggered at the same time during each cycle that pulse generator 48 is triggered in the unit of FIG. 3. The second function of the 32-microsecond pulse is to turn on gate 86. In the event that interface unit 70 recognized the transmission of its address (the same address as that of the subscriber terminal which it serves), the 32-bit message which immediately follows the address is allowed to be transmitted through gate 86 to the input of 32-bit shift register 88. The reason for entering the message into the shift register is to determine if it is one of the four predetermined 32-bit messages which the interface unit is designed to recognize. If the address of the unit has not been transmitted, there is no need to examine the message.

The trailing edge of the 14-microsecond pulse generated by pulse generator 67 triggers pulse generator 76. This pulse generator generates a pulse having a width of 32 microseconds, the trailing edge of which triggers the operation of each of comparators 90, 94, 98 and 102, and also, after a slight built-in delay, clears shift register 88. Thus, after the 32-bit message is stored in the shift register, and after it has been examined to see if it is one of the four predetermined coded messages, a slightly delayed clear pulse clears the shift register preparatory to another cycle of operation.

The 32-bit message in register 88 is applied to one 32-bit input of each of comparators 90, 94, 98 and 102. The other 32-bit input to each of these comparators is a message stored in a respective one of registers 92, 96, 100 and 104. Each of the first, second, third and fourth message registers contains a different 32-bit code which the interface unit must recognize.

Flip-flop 106 is ordinarily reset and its output, connected to the control terminal of gate 72, is ordinarily energized. Thus gate 72 normally controls the transmission of signals from cable 110 to the subscriber terminal. In the event comparator 90 determines that the first message has been transmitted from the central control, it energizes its output to set flip-flop 106. In such a case the output of the flip-flop is de-energized and gate 72 no longer allows transmission of signals through it. On the other hand, to re-enable the gate, comparator 94 must recognize the second message in shift register 88. Upon detecting a match, the comparator energizes its output terminal to reset flip-flop 106. Similarly, comparators 98 and 102 serve to set and reset flip-flop 108 to control transmission through gate 74.

The recognition of commands as well as an address by a subscriber interface unit permits the unit to execute functions in addition to simply controlling transmission from the subscriber terminal to the cable during the proper time slot. It is also possible to provide a command recognition capability in an interface unit such as that of FIG. 3 which services several subscribers since the command recognition circuitry would remain the same. FIG. 5 illustrates a different type of action which a subscriber interface unit can take when it recognizes a command. In this particular case, the circuitry of FIGS. 3 and 4 for controlling transmission from each subscriber terminal to the cable during only the proper time slot is not shown. Rather, the system is designed to allow the same central control to service all of the subscribers in two different cable systems.

Two pairs of cables 140, 142 and 144, 146 are shown, with a pair of switches 170, 172 connected between them. Ordinarily, both switches are open and each pair of cables is connected to its respective central control. (Instead of pairs of cables in the system, two bi-directional cables can be utilized.) The two systems are completely separate and each can service the maximum number of subscribers which can be serviced in a 14-bit address system. But the subscriber interface units are designed so that in the event one of the central controls malfunctions, the other central control can service both systems. By closing switches 170 and 172, the operative central control may be connected to both pairs of cables. The problem, however, is that two subscriber terminals now respond to each transmitted address. The command recognition circuitries in the subscriber interface units are designed to control the alternate enabling of pairs of subscriber terminals having the same address. Although each subscriber terminal is serviced only half as often, this is better than having half of the subscribers served not at all.

Downstream cable 140 is connected to filter 154 in subscriber interface unit 150. The filter transmits all of the downstream signals except the address and message signals in the 108–112 MHz band. Filter 158 allows data signals to be transmitted through it but instead of the output of the filter being connected directly to the subscriber terminal, the signals must pass through gate 156. Ordinarily, this gate is enabled by the energized output of OR gate 160, as will be described below. Filter 44 serves to transmit address and message signals from the subscriber terminal to upstream cable 142, and, as described above, although in the system of FIG. 5 no concern is paid to insuring that a subscriber terminal can transmit only during its respective time slot, the interface units of FIG. 5 can be modified easily along the lines of those of FIGs. 3 and 4 for this purpose.

Filter 58, demodulator 60, end-of-pause detector 64, 14-microsecond pulse generator 67, gate 62, shift register 78, comparator 80, address register 82, pulse generator 84, pulse generator 76, gate 86 and shift register 88 serve the same functions in FIG. 5 as they do in FIG. 4. Following the recognition by the subscriber interface unit of its respective address, the immediately succeeding 32-bit message is stored in shift register 88. Referring to FIG. 4, it will be noted that the output of pulse generator 84 triggers pulse generator 48 to enable the transmission of a message from the subscriber to the cable in the proper time slot. This is of no concern in the system of FIG. 5, and instead the output of pulse generator 84 is applied to the toggle input of flip-flop 162. Every pulse generated by pulse generator 84 controls a change in the state of the flip-flop.

The first message represented by the 32 bits in register 92 are an indication that the system is to function in the mode in which each subscriber is to be serviced at only half the usual rate. The message stored in register 96, on the other hand, represents a return to the normal mode. Whenever comparator 90 detects a match, it energizes its output to set flip-flop 160. On the other hand, whenever comparator 94 detects a match, it energizes its output to reset the flip-flop.

If the system is operating normally, then flip-flop 160 is reset and its 0 output is energized. Since this output is connected to one input of OR gate 60, the output of the OR gate is energized and gate 156 is enabled continuously. Thus whenever the address of the respective subscriber interface unit is transmitted by the central control, the address and the following message (along with all other addresses and messages) are transmitted through gate 156 to the subscriber terminal.

However, after a command is transmitted to subscriber interface unit 150 that is recognized by comparator 90, flip-flop 160 is set in the 1 state. At this time, the upper input of OR gate 160 is no longer energized continuously. Instead, with the setting of flip-flop 160 in the 1 state, flip-flop 162 is reset. The 0 output of this flip-flop is energized and the 1 output is de-energized. Since the lower input of OR gate 160 is de-energized, its output is low and gate 156 turns off. This means that no more addresses and messages are transmitted through gate 156 to the subscriber terminal.

The next time that the address of the subscriber terminal and interface unit is transmitted, it does not pass through gate 156. However, it is recognized by comparator 80 and thus pulse generator 84 is triggered. After 32-microseconds have elapsed, that is, after the 32-bit message has been transmitted, the trailing edge of the 32-microsecond pulse appears at the toggle input of the flip-flop. The flip-flop now changes state and its 1 output in energized. This causes OR gate 160 to energize its output and gate 156 to close. Although addresses and messages are now transmitted through the gate, the subscriber terminal does not recognize any of the addresses until the next one that is its own is sent. At this time, it recognizes its address and responds to the transmitted message. However, once again at the trailing edge of the pulse generated by pulse generator 84, flip-flop 162 switches state. With the 1 output of the flip-flop now de-energized, gate 156 remains open and it is not until the end of the next transmission of the address of the subscriber terminal and the succeeding message that gate 156 turns on. It is thus apparent that only every other address and message for the respective subscriber terminal passes through gate 156.

When it is time to resume normal operation, the address of the subscriber interface unit is transmitted, followed by a command which is recognized by comparator 94.

Flip-flop 160 is reset and consequently gate 156 is enabled continuously. The fact that flip-flop 162 continuously switches state following each recognition by comparator 80 of the address of the subscriber terminal is of no moment because gate 156 is energized continuously.

Subscriber interface unit 152, connected to the other pair of cables 144, 146, is identical to subscriber interface unit 150 except that the 1 output of flip-flop 160 is connected to the set input of flip-flop 162. This means that as soon as flip-flop 160 is set, flip-flop 162 is similarly set and gate 156 in subscriber interface unit 152 is enabled. Following each transmission of the address which is recognized by subscriber interface unit 152, the state of flip-flop 162 switches. Consequently, only alternate addresses and messages are transmitted to the respective subscriber terminal. The only difference between the two subscriber interface units is that in one case flip-flop 162 is initially reset and in the other case it is initially set following the recognition of a command for both units to operate in the alternating mode. It is the initial different setting of flip-flop 162 in the two units that controls the alternating of the transmission between the two interface units.

In order to switch to the alternating mode, switches 170 and 172 are first closed. The central control then transmits the address of every subscriber terminal, with each address being followed by the "alternating" command. When each address is transmitted, the two subscriber interface units in a pair recognize the address and then respond to the succeeding command by setting or resetting their respective flip-flops 162. Following the complete sequencing through all of the addresses, the central control resumes normal operation with the difference, however, that it now services twice as many subscribers, each at half the normal rate. In order to resume normal processing, the central control again transmits all of the system addresses, with each address being followed by the transmission of the "normal mode" code message. Immediately after all of the subscriber interface units respond by having their flip-flops 160 reset, switches 170 and 172 are opened and each central control then services its own cable system.

The cable coupler 120 of FIG. 6 illustrates a still further extension of command responses which are possible when individual equipments other than subscriber terminals are assigned addresses. Successive sections of cables 110 and 112 are interconnected by cable couplers, only two of which are shown in FIG. 6. Along each section of cable there are various interface units 70. Each cable coupler includes a pair of amplifiers 126, 128 for amplifying signals. In addition, each cable coupler includes a pair of gates 122, 124, both of which are normally enabled. The normal mode of the system is for the cable couplers to control amplification of signals rather than to block them.

Each cable coupler is assigned an address which is different from those of the subscriber terminals. Each cable coupler includes the same circuitry as does the subscriber interface unit of FIG. 4 for recognizing an address and one of four commands. Depending upon the command which is recognized, each of flip-flops 106 and 108 can be set or reset. While the flip-flops in the subscriber interface unit of FIG. 4 serve to enable or disable gates 72 and 74 coupled to the subscriber terminal, the flip-flops in the cable coupler of FIG. 6 serve to enable or disable gates 122 and 124. In this manner further transmission up and down the cables can be controlled.

For example, if a cable coupler receives a command to turn off a downstream gate 122, then no downstream signals are transmitted past that cable coupler and all of the subscribers past that cable coupler no longer receive service. Similarly, if the command transmitted to a cable coupler is to disable the respective upstream gate 124, then no message from the subscribers further downstream from that cable coupler are received by the central control. This type of control of the cable couplers facilitates the diagnosis of cable malfunctions. Furthermore, by providing the cable couplers with uniquely assigned addresses and the capability of recognizing commands, further functions are possible. For example, cable couplers might be provided with variable gain amplifiers, the gains of which might be controlled depending upon the recognition of particular commands.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What I claim is:

1. In a two-way cable television system having cable means, a central control connected to said cable means for transmitting downstream address and message signals and for receiving upstream message signals, and a plurality of subscriber terminals coupled in parallel to said cable means each of which receives signals from and transmits message signals to said cable means, said subscriber terminals being situated on the different residential premises of respective subscribers, the improvement comprising a plurality of interface units situated off the premises of said subscribers and out of their reach and control, each for coupling at least one subscriber terminal to said cable means, each of said interface units including means for recognizing the downstream transmission of the address of the respective at least one subscriber terminal, means for recognizing the downstream transmission of predetermined messages following the recognition of the downstream transmission of the address of the respective at least one subscriber terminal, and means responsive to the recognition of said predetermined messages for controlling thereafter respective modes of transmission of signals between said cable means and said at least one subscriber terminal, and wherein said controlling means includes means responsive to the recognition of the downstream transmission of a first predetermined message for thereafter enabling transmission therethrough of a message from said at least one subscriber terminal to said cable means during predetermined time periods following less than all of the recognitions of the address of the respective at least one subscriber terminal, and means responsive to the recognition of the downstream transmission of a second predetermined message for thereafter enabling the transmission therethrough of a message from said at least one subscriber terminal to said cable means during predetermined time periods following every recognition of the address of the respective at least one subscriber terminal.

2. In a two-way cable television system having cable means, a central control connected to said cable means for transmitting downstream address and message signals, and a plurality of subscriber terminals coupled in parallel to said cable means each of which receives signals from and transmits message signals to said cable means, said subscriber terminals being situated on the different residential premises of respective subscribers, the improvement comprising a plurality of interface units situated off the premises of said subscribers and out of their reach and control, each for coupling at least one subscriber terminal to said cable means, each of said interface units including means for recognizing the downstream transmission of the address of the respective at least one subscriber terminal, means for recognizing the downstream transmission of predetermined messages following the recognition of the downstream transmission of the address of the respective at least one subscriber terminal, and means responsive to the recognition of said predetermined messages for controlling thereafter respective modes of transmission of signals between said cable means and said at least one subscriber terminal, and wherein each of said interface units couples a respective plurality of subscriber terminals to said cable means, all of the subscriber terminals coupled to said cable means by the same interface unit having respective addresses with a portion thereof in common, and said address recognizing means is operative to recognize the downstream transmission of said common address portion for operating said controlling means.

* * * * *